Dec. 11, 1956  R. D. DREW  2,773,840
OPERATION OF HYDROGEL BEAD-FORMING TOWER
Filed Sept. 19, 1952

INVENTOR.
ROBERT D. DREW
BY
Raymond W. Barclay
ATTORNEY

United States Patent Office 2,773,840
Patented Dec. 11, 1956

2,773,840

OPERATION OF HYDROGEL BEAD-FORMING TOWER

Robert D. Drew, Wenonah, N. J., assignor to Socony Mobil Oil Company, Inc., a corporation of New York Application September 19, 1952, Serial No. 310,432

9 Claims. (Cl. 252—448)

This invention relates to an improvement in the operation and construction of an apparatus for forming inorganic hydrogel particles in the form of spheroids. More particularly, the present invention is concerned with an improved process and apparatus for effecting smooth, uninterrupted operation of a forming tower wherein globules of hydrosol set to spherical particles of hydrogel in a water-immiscible medium and are thereafter removed from said medium.

It has heretofore been well known to prepare spheroidal hydrogel particles by dispersing or distributing a hydrosol in the form of globules, characterized by a rapid time of set, into a body of water-immiscible liquid where the hydrosol particles set to spheroidal particles of hydrogel. The hydrogel particles so formed are thereafter removed from the water-immiscible liquid, dried, and tempered to yield hard, bead-like gel particles. The usual method for preparing such hydrogel particles has involved the injection of an inorganic oxide hydrosol of desired composition in the form of relatively small droplets or globules into a body of liquid which is substantially immiscible with water, the depth of said liquid and the gelation time of the sol being so correlated that gelation will occur while the sol is in the form of globules in the body of water-immiscible liquid. A common expedient has been to employ a liquid having a density less than that of water and overlying a body of water. In such instance, the hydrosol globules gel as they pass through the water-immiscible liquid and fall into the underlying water layer from which they are washed in a stream of water to further processing. It has also been suggested to employ a liquid having a density greater than that of water and to introduce the hydrosol, in globular form, at the bottom of a tower containing such liquid so that the hydrosol particles set to hydrogel as they rise through the body of water-immiscible liquid. In such method, a layer of water usually overlies the body of water-immiscible liquid and the hydrogel particles are washed from this layer in a stream of water. The resultant hydrogel pellets formed by either of the above methods of operation are washed free of the water-immiscible liquid, dried, and, if desired, calcined.

Another suggested method of operation has been to employ a single liquid as the medium in which the hydrosol globules set to hydrogel and are thereafter washed in a stream from the forming tower. The specific gravity of such liquid is generally less than the specific gravity of the hydrosol, so that the injected globules of hydrosol move downwardly through the suspending liquid. When the globules have descended to the bottom of the liquid column, they are entrained by a stream of the same liquid and removed from the forming tower. The depth of liquid in the forming tower is sufficiently great that the globules of hydrosol set to hydrogel by the time they have descended through the column of liquid. The necessary height of the tower and column of liquid contained therein will vary, depending upon the setting time of the gel and upon the rate of descent of the globules through the suspending liquid. This rate of descent is controlled by the relative densities of the hydrosol globules and of the suspending liquid, by the size of the globules, and by the viscosity of the suspending liquid.

The use of a single liquid as a forming medium and for washing the resulting hydrogel particles from the forming tower has been particularly desirable in instances where the suspending liquid necessarily has a specific gravity greater than that of water. Such suspending liquids are essential in imparting the desired spheroidal shape to hydrosol particles having a substantial product concentration, that is, greater than about 10 percent by weight. In the production of certain gel particles, it is advisable to maintain the freshly formed hydrogel out of contact with water. The use of a single water-immiscible liquid in the forming tower and for washing a stream of the formed particles therefrom has been employed with advantage in such cases.

However, in preparing spheroidal hydrogel particles by ejecting a hydrosol into a body of water-immiscible liquid having a specific gravity less than that of the hydrosol and washing the formed hydrogel particles with a stream of said water-immiscible liquid from the bottom of the forming tower through an outlet conduit of restricted cross-section, it has been found, from time to time during the course of operation, that the hydrogel particles have a tendency to collect in the outlet conduit, thereby causing inefficient operation of the forming tower and blocking the passage of additional hydrogel globules through said conduit. Such blocking, in turn, has caused the formed hydrogel particles to back up and accumulate in the forming tower and the suspending liquid to overflow the forming tower. In the case where a two-phase liquid system has been employed in the forming tower, i. e., a body of water-immiscible liquid wherein the hydrosol particles set to hydrogel and an underlying layer of water forming an interface with said water-immiscible liquid, inefficient operation caused by blocking of the outlet conduit with hydrogel particles has not been encountered since any tendency for the hydrogel particles to collect in the outlet conduit and block the same has been counteracted by backing up into the forming tower of the water layer which eventually rises to such a point that the weight thereof is sufficient to break up the block of hydrogel particles and return the system to normal flow conditions. Thus, while operation of the hydrogel forming tower in which the two-liquid system has been employed is substantially automatic in correcting abnormal flow conditions caused by accumulation of hydrogel particles in the outlet conduit, corresponding operation of a hydrogel forming tower using a single liquid has not been automatic in correction of such abnormal flow conditions and the blocking of the outlet conduit with hydrogel particles under abnormal conditions of operation has necessitated frequent shut-down of the forming tower for the purpose of freeing the outlet conduit of hydrogel accumulated therein. As will be evident, such shut-downs are highly inefficient, causing a loss of time and labor and rendering the overall production of gel bead product more expensive.

It is a major object of this invention to overcome the abovedescribed inefficient operation of hydrogel bead-forming towers. Another object is the provision of means for overcoming the tendency for a hydrogel-forming tower wherein a single liquid phase is present to become plugged with hydrogel particles. A further object is to provide automatic means for correction of abnormal hydrogel flow conditions in the outlet conduit of the hydrogel forming tower.

The above and other objects which will be apparent to those skilled in the art are achieved in accordance with the present invention. It has been found, in accordance with the instant invention, that smooth, uninterrupted operation of the hydrogel forming tower may be attained and plugging of the outlet conduit with hydrogel globules may be eliminated by the introduction of a stream of an inert gas, such as air, into the outlet conduit through which the hydrogel particles are conducted from the liquid chamber. The introduction of gas into the outlet conduit may be accomplished either manually by the insertion of a gas hose into the outlet conduit or the introduction of gas into the outlet conduit may be made automatic, responsive to the height of water-immiscible suspending liquid in an overflow box as described hereinbelow. It has been found that, with the introduction of a stream of inert gas into the outlet conduit through which the hydrogel beads are conducted from the forming tower, continued operation of the hydrogel forming tower is accomplished, thereby eliminating shutdowns necessitated by the build-up of hydrogel beads in the outlet conduit and leading to an overall, more efficient operation.

Having described in a general way the nature of this invention, it may be more readily understood by reference to the drawings wherein.

Figure 2:
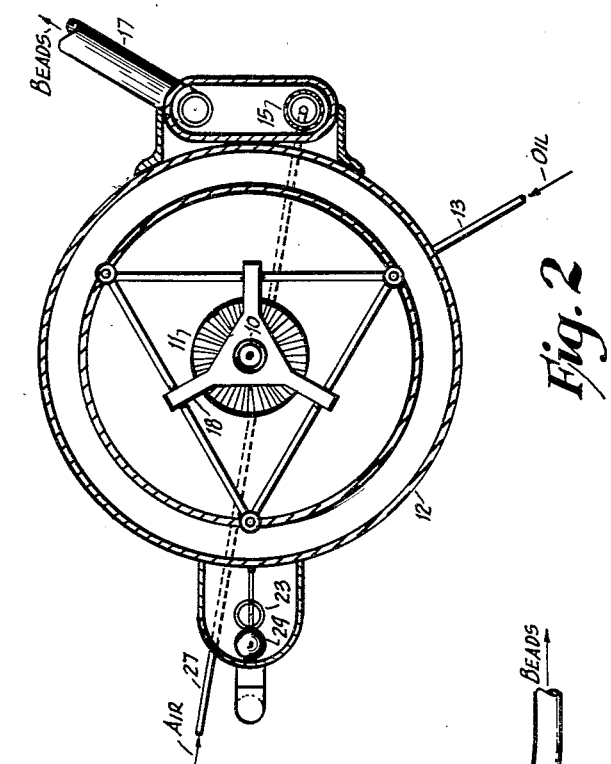
Figure 2 is a plan view of the apparatus of Figure 1.
Figure 1:
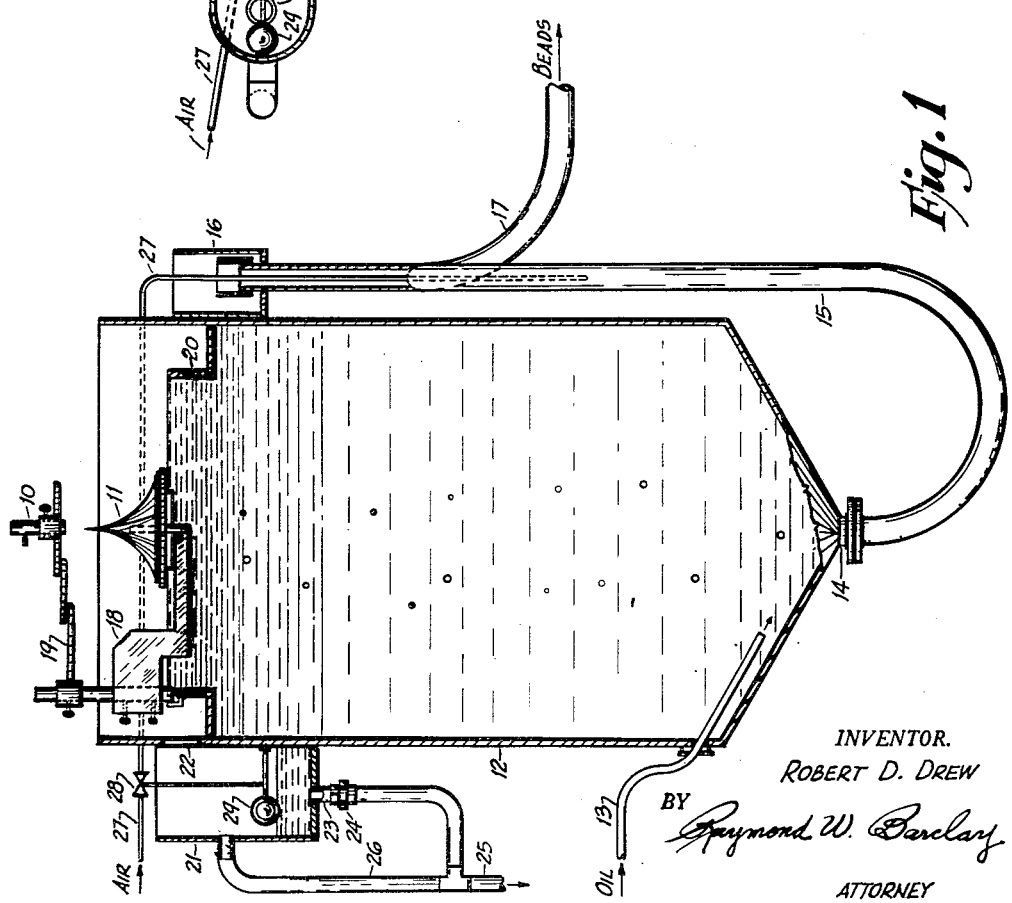
Figure 1 is an elevation in partial section of apparatus for forming hydrogel beads in accordance with the present invention.

Referring to Figure 1, a mixing nozzle 10 is mounted over a conical divider 11 which projects into a column of water-immiscible suspending liquid in forming tower 12. The colloidal solution from which the pellets are formed is mixed and admitted through nozzle 10 to the top of the divider 11 which is fluted and divides the stream of solution into a plurality of smaller streams which enter the column of water-immiscible suspending liquid in tower 12 as small droplets. The surface of the divider is curved in the manner shown to provide a steep pitch at the apex while the surface of the divider near the base approaches the horizontal. Due to the gradually changing pitch of the divided surface, the streams flow smoothly and at the bottom of the divider are introduced at a reduced velocity to the body of immiscible liquid. The length of the column of suspending liquid and the gelation time of the sols are so regulated that the droplets will gel before passing out of the forming tower. Suspending liquid is continuously supplied through inlet 13. The flow of suspending liquid carries away the hydrogel pellets through outlet 14 and through conduit 15 to weir box 16. The hydrogel pellets then pass through outlet 17 to suitable washing and treating stages.

The conical divider is suitably held in position by support 18 and nozzle 10 is maintained in fixed position by support 19. The height of the water-immiscible liquid is maintained at a fairly definite level by annular trough 20 and is so regulated that it just covers the bottom of the conical divider. Thus, there is essentially no turbulence or mixing at the points of juncture of the two liquids. This will inhibit occlusion of water-immiscible liquid in the gel pellets. The height of the water-immiscible liquid is maintained substantially constant by the provision of an overflow box 21 into which excess liquid may overflow through outlet 22 from the top of the forming tower. Excess liquid overflowing into box 21 passes therefrom through outlet 23, flowing through an orifice of restricted cross-section 24 and being conducted to outlet conduit 25, through which it is led to storage. Overflow box 20 is also provided with a second outlet conduit 26 piercing the wall of box 20 at a point intermediate its top and bottom and providing for the removal of a large excess of water-immiscible liquid from the overflow box.

In accordance with the present invention, a stream of an inert gas is introduced intermittently as required into outlet conduit 15 through a tube 27. Tube 27 is of a substantially lesser cross-section than conduit 15 and is suitably inserted into the interior of conduit 15 below the level of the mixture of water-immiscible liquid and hydrogel particles contained therein. In a preferred embodiment of the invention, the gas is introduced through tube 27, responsive to the height of water-immiscible liquid in overflow box 21. This is accomplished by suitable means as, for example, by the provision of a valve 28 in the gas line, which is manipulated responsive to a float 29 maintained at the level of liquid present in overflow box 21. Thus, assuming outlet conduit 15, due to abnormal operation, becomes plugged with hydrogel particles, the liquid in tower 12 begins to overflow at its upper level. When the height of the liquid in overflow box 21 reaches a predetermined point, the rising liquid contacts float 29 which, in turn, responsively opens valve 28, permitting the inert gas to flow under pressure through tube 27 and into the interior of conduit 15. The flow of gas into conduit 15 brings about a lowering of the density of the mixture of water-immiscible liquid and hydrogel particles contained in this conduit. The lowering of density so accomplished in conduit 15, combined with the back pressure of hydrogel globules entering conduit 15 and water-immiscible entraining liquid serves to undo plugging of conduit 15 caused by the accumulation of hydrogel particles therein and to return the system to smooth, normal flow. This, in turn, reduces the liquid overflow into box 21, causing the liquid therein to fall below and out of contact with float 29. This responsively closes valve 28 and shuts off the stream of gas flowing through tube 27. The above operation is repeated whenever outlet conduit becomes plugged or blocked with hydrogel particles, thereby affording an automatic means for assuring uninterrupted operation of the hydrogel forming tower.

The inert gas employed herein is preferably air. However, other gases, inert under the conditions of operation, may likewise be employed. Suitable gases for such purpose include nitrogen, oxygen, and carbon dioxide. The gas stream is introduced under a pressure sufficient to overcome the pressure head of the water-immiscible liquid and hydrogel particles contained in the outlet conduit. Generally, the pressure of the gas stream introduced is between about 1 and about 5 pounds per square inch but may be higher.

In order to produce as uniform hydrogel beads as possible and to reduce to a minimum the formation of undesirably small beads, it is important to reduce the fluctuations of the immiscible liquid level to a minimum and maintain this level up to the base of the conical divider so that the hydrosol streams do not have to drop any distance from the divider into the liquid. By maintaining a flow of the water-immiscible liquid into the forming tower and the provision of an overflow box, the height of liquid in said overflow box being made responsive to the introduction of gas into conduit 15, the level of water-immiscible liquid in forming tower 12 is maintained constant while the immiscible liquid overflow from the tower compensates for any immiscible-liquid head changes.

It is contemplated that the hydrogel-forming apparatus and process described herein may be used for the preparation of any inorganic oxide gels conveniently prepared in a forming tower containing a single liquid. Typical of the hydrogels which may be prepared are those of silica, silica-alumina, silica-alumina-zirconia, silica-magnesia, silica - alumina-magnesia, chromia - alumina, etc. The method may be further extended to improve the manufacture of many other types of gels.

The time of gelation in accordance with well-known principles is dependent upon temperature, pH, and concentrations of reactants. The pH and concentration being constant, the time of gelation will decrease with an increase in temperature. Thus, the time of gelation can be regulated by controlling the temperature of the introduced water-immiscible liquid through which the particles fall.

It is contemplated that the hydrosol globules may be introduced into the forming tower by means other than a divided cone as described above, although such divider is a preferred means for effecting distribution of the hydrogel globules in the water-immiscible liquid. Thus, it is contemplated that the hydrosol may be introduced into the body of water-immiscible liquid by any of the other various dispersing means which have been employed in the formation of hydrosol globules, such as the introduction of hydrosol into the body of water-immiscible liquid from a revolving disc or the like.

The apparatus and method of the instant invention has been found to provide an inexpensive and highly effective means for overcoming a heretofore troublesome problem in the operation of hydrogel forming towers containing a single liquid phase.

I claim:

1. An apparatus for forming generally spheroidal hydrogel pellets comprising a vertical liquid chamber, distributing means for introducing hydrosol in the form of small globules into the liquid in said chamber, an inlet to admit liquid into said chamber, an outlet to withdraw liquid and formed hydrogel pellets from the bottom of said chamber and means for injecting a gas into said outlet below the surface of the mixture of liquid and hydrogel pellets contained therein.

2. An apparatus for forming generally spheroidal hydrogel pellets comprising a vertical liquid chamber, a conical fluted surface for dividing a stream of hydrosol into a plurality of smaller streams, the end of said surface resting on the level of liquid in said chamber, an inlet to admit liquid into said chamber, an outlet to withdraw liquid and formed hydrogel pellets from the bottom of said chamber and means for injecting a gas into said outlet below the surface of the mixture of liquid and hydrogel pellets contained therein.

3. An apparatus for forming generally spheroidal hydrogel pellets comprising a vertical liquid chamber, distributing means for introducing hydrosol in the form of small globules into the liquid in said chamber, an inlet to admit liquid into said chamber, an overflow box to collect liquid from said chamber, an outlet to withdraw liquid and formed hydrogel pellets from the bottom of said chamber, means for injecting a gas into said outlet below the surface of the mixture of liquid and hydrogel pellets contained therein, and means for controlling the flow of said gas responsive to the height of liquid in said overflow box.

4. An apparatus for forming generally spheroidal hydrogel pellets comprising a vertical liquid chamber, a conical fluted surface for dividing a stream of hydrosol into a plurality of smaller streams, the end of said surface resting on the level of liquid in said chamber, an inlet to admit liquid into said chamber, an overflow box to collect liquid from said chamber, an outlet to withdraw liquid and formed hydrogel pellets from the bottom of said chamber, means for injecting a gas into said outlet below the surface of the mixture of liquid and hydrogel pellets contained therein, and means for controlling the flow of said gas responsive to the height of liquid in said overflow box.

5. A process for the manufacture of spheroidal pellets of inorganic oxide hydrogel, which comprises forming a gelable hydrosol of inorganic oxide, permitting said sol to fall in the form of globules through a body of water-immiscible liquid and set to a firm hydrogel therein, the gelation time of said sol and the depth of said body of liquid being so correlated that gelation will occur therein, removing a stream of said water-immiscible liquid and formed hydrogel pellets from said body and injecting an inert gas into said stream in an amount sufficient to lower the density of said stream and to result in continued flow thereof from said body.

6. A process for the manufacture of spheroidal pellets of inorganic oxide hydrogel, which comprises forming a gelable hydrosol of inorganic oxide, flowing said hydrosol downward over a generally conical fluted surface to divide said hydrosol into a plurality of streams into a body of water-immiscible liquid, maintaining the level of said body substantially at the end of said conical fluted surface, permitting said sol to fall through said body of liquid and set to a firm hydrogel therein, the gelation time of said sol and the depth of said body of liquid being so correlated that gelation will occur therein, removing a stream of said water-immiscible liquid and formed hydrogel pellets from said body and injecting air into said stream in an amount sufficient to lower the density of said stream and to result in continued flow thereof from said body.

7. A process for the manufacture of spheroidal pellets of inorganic oxide hydrogel, which comprises forming a gelable hydrosol of inorganic oxide, permitting said sol to fall in the form of globules through a body of water-immiscible liquid and set to a firm hydrogel therein, the gelation time of said sol and the depth of said body of liquid being so correlated that gelation will occur therein, continuously introducing water-immiscible liquid to said body, collecting liquid overflow from said body in a pool, removing a stream of said water-immiscible liquid and formed hydrogel pellets from said body and injecting an inert gas into said stream in an amount responsive to the height of liquid collected in said pool whereby liquid overflow from said body into said pool is decreased, the density of said stream is lowered and continued flow of said stream from said body is achieved.

8. In a process for forming spheroidal pellets of inorganic oxide hydrogel by introducing a gelable hydrosol of inorganic oxide in the form of globules into a body of water-immiscible liquid, permitting said globules to set to hydrogel in said liquid and removing a stream of said water-immiscible liquid and formed hydrogel pellets from said body, the improvement in operation for overcoming the tendency of the formed hydrogel pellets to collect in said stream and reduce the rate of flow thereof, which comprises injecting an inert gas into said stream in an amount such as to lower the density of said stream to an extent sufficient to result in continued flow thereof from said body.

9. In a process for forming spheroidal pellets of inorganic oxide hydrogel by introducing a gelable hydrosol of inorganic oxide, in the form of globules, into a body of water-immiscible liquid and removing a stream of said water-immiscible and formed hydrogel pellets from said body, the improvement in operation for overcoming the tendency of the formed hydrogel pellets to collect in said stream, thereby reducing the rate of flow thereof and causing water-immiscible liquid to overflow said body, which comprises injecting air into said stream, the rate of flow of said air being responsive to the amount of liquid overflow from said body whereby the density of said stream is lowered and continued flow thereof from said body is achieved.

References Cited in the file of this patent

UNITED STATES PATENTS

| Number | Name | Date |
| --- | --- | --- |
| 556,939 | Rochemovitz | Mar. 24, 1896 |
| 2,449,664 | Marisic | Aug. 21, 1948 |
| 2,459,903 | Voorhees | Jan. 25, 1949 |
| 2,505,895 | Heard | May 2, 1950 |
| 2,543,132 | Shabaker | Feb. 27, 1951 |
| 2,584,286 | Pierce et al. | Feb. 5, 1952 |
| 2,607,482 | Weisz | Aug. 19, 1952 |